United States Patent
Sugai (10) Patent No.: US 10,857,995 B2
(45) Date of Patent: Dec. 8, 2020

(54) VEHICLE ATTITUDE CONTROL DEVICE

(71) Applicant: NTN CORPORATION, Osaka (JP)

(72) Inventor: Tomohiro Sugai, Iwata (JP)

(73) Assignee: NTN CORPORATION, Osaka (JP)

( * ) Notice: Subject to any disclaimer, the term of this patent is extended or adjusted under 35 U.S.C. 154(b) by 246 days.

(21) Appl. No.: 15/934,205

(22) Filed: Mar. 23, 2018

(65) Prior Publication Data

US 2018/0208184 A1 Jul. 26, 2018

Related U.S. Application Data

(63) Continuation of application No. PCT/JP2016/078015, filed on Sep. 23, 2016.

(30) Foreign Application Priority Data

Sep. 25, 2015 (JP) .................. 2015-188000

(51) Int. Cl.
*B60W 30/045* (2012.01)
*B60W 30/18* (2012.01)
(Continued)

(52) U.S. Cl.
CPC ....... *B60W 30/045* (2013.01); *B60L 15/2009* (2013.01); *B60L 15/2036* (2013.01);
(Continued)

(58) Field of Classification Search
CPC .. B60W 30/045; B60W 30/02; B60W 30/189; B60W 2050/0052;
(Continued)

(56) References Cited

U.S. PATENT DOCUMENTS 5,964,819 A 10/1999 Naito
6,205,375 B1 * 3/2001 Naito .................. B60T 8/1755
280/5.507
(Continued)

FOREIGN PATENT DOCUMENTS

CN 101111417 A 1/2008
CN 101772884 A 7/2010
(Continued)

OTHER PUBLICATIONS

English Translation by WIPO of the International Preliminary Report on Patentability for International Patent Application No. PCT/JP2016/078015, dated Apr. 5, 2018, 9 pgs.
(Continued)

*Primary Examiner* — Tuan C To (57) ABSTRACT

The vehicle attitude control device generates target yaw moment on the basis of the deviation between a standard yaw rate and an actual yaw rate and is applied to a vehicle driven with the target yaw moment. The vehicle attitude control device is provided with a detection speed processor that performs a process such that a vehicle speed gently changes, a limit yaw rate calculator that determines a limit yaw rate by dividing lateral acceleration by the processed vehicle speed, and a standard yaw rate corrector that corrects the standard yaw rate using the limit yaw rate when the standard yaw rate is higher than the limit yaw rate. A target yaw moment calculator generates target yaw moment on the basis of the deviation between the standard yaw rate corrected by the standard yaw rate corrector and the actual yaw rate.

7 Claims, 7 Drawing Sheets

(51) Int. Cl.
- *B60W 30/02* (2012.01)
- *B60L 15/20* (2006.01)
- *B62D 7/15* (2006.01)
- *F16H 59/66* (2006.01)
- *B60W 50/00* (2006.01)

(52) U.S. Cl.
CPC ........ *B60W 30/02* (2013.01); *B60W 30/1819* (2013.01); *B62D 7/159* (2013.01); *F16H 59/66* (2013.01); *B60G 2400/104* (2013.01); *B60G 2400/204* (2013.01); *B60L 2220/46* (2013.01); *B60L 2240/16* (2013.01); *B60L 2240/22* (2013.01); *B60W 2050/0052* (2013.01); *B60W 2510/20* (2013.01); *B60W 2520/10* (2013.01); *B60W 2520/105* (2013.01); *B60W 2520/125* (2013.01); *B60W 2520/14* (2013.01); *B60W 2540/10* (2013.01); *B60W 2540/18* (2013.01); *B60W 2720/14* (2013.01); *B60Y 2200/912* (2013.01)

(58) Field of Classification Search
CPC ......... B60W 2510/20; B60W 2520/10; B60W 2520/105; B60W 2520/125; B60W 2520/14; B60W 2540/10; B60W 2540/18; B60W 2720/14; B60L 15/2009; B60L 15/2036; B60L 2220/46; B60L 2240/22; B62D 7/159; F16H 59/66; B60G 2400/104; B60G 2400/204
USPC .......................................................... 701/72
See application file for complete search history.

(56) References Cited

U.S. PATENT DOCUMENTS

| | | | | |
|---|---|---|---|---|
| 6,219,610 B1* | 4/2001 | Araki | ................... | B60T 8/1755 303/140 |
| 6,226,587 B1* | 5/2001 | Tachihata | ............... | B60K 28/16 303/146 |
| 6,233,513 B1* | 5/2001 | Furukawa | ................ | B62D 6/04 303/146 |
| 6,334,656 B1* | 1/2002 | Furukawa | ............. | B60T 8/1755 303/140 |
| 6,371,234 B2* | 4/2002 | Yasuda | ................... | B60T 8/175 180/197 |
| 6,941,212 B2* | 9/2005 | Sakata | .................... | B60T 8/172 701/44 |
| 7,027,904 B2 | 4/2006 | Ishizu et al. | | |
| 7,137,673 B2* | 11/2006 | Anwar | ................. | B60T 8/1755 303/146 |
| 7,263,424 B2* | 8/2007 | Motoyama | ............ | B60K 23/04 116/36 |
| 7,677,095 B1* | 3/2010 | Bartol | .................... | B60T 8/885 73/146.2 |
| 8,200,391 B2 | 6/2012 | Sakugawa et al. | | |
| 8,355,844 B2* | 1/2013 | Mori | ................... | B60W 10/184 701/48 |
| 8,378,615 B2 | 2/2013 | Tazawa et al. | | |
| 8,901,872 B2 | 12/2014 | Tazawa et al. | | |
| 8,977,434 B2 | 3/2015 | Yoshimoto et al. | | |
| 9,566,979 B2* | 2/2017 | Nishigaki | ............. | B60W 10/20 |
| 2002/0109402 A1* | 8/2002 | Nakamura | .......... | B60W 10/184 303/146 |
| 2003/0060961 A1 | 3/2003 | Ishizu et al. | | |
| 2005/0080546 A1* | 4/2005 | Milot | ...................... | B60C 23/00 701/70 |
| 2005/0102085 A1* | 5/2005 | Sakata | .................... | B60T 8/172 701/72 |
| 2005/0216161 A1* | 9/2005 | Sakugawa | ............. | B60T 8/1755 701/70 |
| 2008/0086251 A1* | 4/2008 | Lu | ......................... | B60T 8/1755 701/70 |
| 2008/0114511 A1 | 5/2008 | Sakugawa et al. | | |
| 2011/0221378 A1 | 9/2011 | Tazawa et al. | | |
| 2012/0316733 A1* | 12/2012 | Futamura | .............. | B60T 8/1755 701/42 |
| 2012/0316745 A1 | 12/2012 | Futamura et al. | | |
| 2013/0030601 A1 | 1/2013 | Yoon | | |
| 2013/0090810 A1 | 4/2013 | Yoshimoto et al. | | |
| 2013/0113409 A1 | 5/2013 | Tazawa et al. | | |
| 2015/0183428 A1* | 7/2015 | Nishigaki | ............. | B60W 10/20 701/41 |
| 2015/0217736 A1* | 8/2015 | Nomura | ................... | B60T 7/12 701/70 |

FOREIGN PATENT DOCUMENTS

| | | | | |
|---|---|---|---|---|
| CN | 102822022 A | | 12/2012 | |
| CN | 103112444 A | | 5/2013 | |
| CN | 103223940 A | | 7/2013 | |
| EP | 2 889 196 A1 | | 7/2015 | |
| GB | 2319823 A | * | 6/1998 | ............ B60T 8/1755 |
| JP | 05155346 A | * | 6/1993 | |
| JP | 07047853 A | * | 2/1995 | |
| JP | 9-2316 A | | 1/1997 | |
| JP | 3183124 B | | 4/2001 | |
| JP | 2003-170759 A | | 6/2003 | |
| JP | 3463415 | | 8/2003 | |
| JP | 2005-247276 | | 9/2005 | |
| JP | 2007-22232 A | | 2/2007 | |
| JP | 4155246 B2 | * | 9/2008 | |
| JP | 4239861 | | 1/2009 | |
| JP | 4446935 | | 1/2010 | |
| JP | 5078484 B | | 9/2012 | |
| JP | 2012-210832 A | | 11/2012 | |
| KR | 20130024256 A | * | 3/2013 | |
| KR | 20140063168 A | * | 5/2014 | |

OTHER PUBLICATIONS

Extended European Search Report dated Apr. 23, 2019 in corresponding European Patent Application No. 16848658.7 (7 pages).
Japanese Office Action dated Apr. 23, 2019 in corresponding Japanese Patent Application No. 2015-188000 (4 pages).
International Search Report dated Dec. 20, 2016 in corresponding International Patent Application No. PCT/JP2016/078015.
Office Action, dated Jul. 27, 2020, in corresponding Chinese Application No. 201680043689.3 (15 pp.).

* cited by examiner

TIME OF INHIBITION OF RIGHT CORNERING UNDERSTEER

Fig. 5B

TIME OF INHIBITION OF RIGHT CORNERING TACK-IN

Fig. 6A — RESULTS OF ACTUAL VEHICLE TEST FOR FOUR-WHEEL IN-WHEEL MOTOR VEHICLE

WITHOUT GRADIENT LIMITATION ON VEHICLE SPEED

Fig. 6B

WITH GRADIENT LIMITATION ON VEHICLE SPEED

Fig. 7

VEHICLE ATTITUDE CONTROL DEVICE

CROSS REFERENCE TO THE RELATED APPLICATION

This application is a continuation application, under 35 U.S.C. § 111(a), of international application No. PCT/JP2016/078015, filed Sep. 23, 2016, which is based on and claims Convention priority to Japanese patent application No. 2015-188000, filed Sep. 25, 2015, the entire disclosure of which is herein incorporated by reference as a part of this application.

BACKGROUND OF THE INVENTION

Field of the Invention

The present invention relates to a vehicle attitude control device that stabilizes vehicle behavior during cornering.

Description of Related Art

Hitherto, as a vehicle attitude control device, a device has been known which obtains a target yaw rate from various vehicle state quantities such as a vehicle speed and a steering angle, generates target yaw moment on the basis of the deviation between the target yaw rate and an actual yaw rate, and applies braking/driving force, required to achieve the above-mentioned target yaw moment, to each wheel, thereby ensuring stable vehicle behavior (for example, Patent Document 1).

However, in the case where only a yaw rate is set as a state quantity that is a motion target for a vehicle, in a limit range where cornering power of a tire has non-linear characteristics, sideslip angle of a vehicle also increases when the target yaw rate is achieved in the vehicle (i.e. when the vehicle is driven under the target yaw rate), so that the behavior of the vehicle becomes unstable in some cases. Therefore, in Patent Document 2 or Patent Document 3, a value of yaw rate obtained by dividing actual lateral acceleration by a vehicle speed is set as an upper limit, and a target yaw rate obtained from various vehicle state quantities such as the vehicle speed and the steering angle is corrected, thereby inhibiting an excessive increase in the sideslip angle.

Also, hitherto, a tack-in phenomenon in which the yaw rate of a vehicle increases has been known to occur when depression of an accelerator pedal is quickly released during cornering of the vehicle. The tack-in phenomenon is a phenomenon that cornering force of each front wheel increases due to tire grounding characteristics and load movement by vehicle deceleration, resulting in a rapid decrease in cornering radius. In addition, the cornering force of each front wheel has been known to decrease to cause a tendency of understeer when the accelerator pedal is depressed during cornering. In any of these cases, since the vehicle attitude during cornering greatly changes due to accelerator manipulation, the stability of the vehicle may deteriorate or a feeling of discomfort may be given to a driver.

RELATED DOCUMENT

Patent Document

[Patent Document 1] JP Patent No. 3183124
[Patent Document 2] JP Laid-open Patent Publication No. H09-002316
[Patent Document 3] JP Patent No. 5078484

When depression of the accelerator pedal is quickly released during cornering and acceleration running, with the method of Patent Document 2 or 3, the value of yaw rate obtained by dividing the actual lateral acceleration by the vehicle speed increases with a decrease in the vehicle speed, and the target yaw rate is corrected with this value as an upper limit, so that the target yaw rate also increases. Thus, an increase in the yaw rate due to tack-in cannot be inhibited in some cases. In addition, when the accelerator pedal is depressed during cornering, with the method of Patent Document 2 or 3, the value of yaw rate obtained by dividing the actual lateral acceleration by the vehicle speed decreases with an increase in the speed, and the target yaw rate is corrected with this value as an upper limit, so that the target yaw rate also decreases. Thus, the yaw rate does not increase and understeer cannot be inhibited in some cases.

SUMMARY OF THE INVENTION

The present invention has been made to solve the above problem, and an object of the present invention is to provide a vehicle attitude control device that can inhibit or suppress understeer or tack-in when an accelerator pedal is depressed or depression of the accelerator pedal is quickly released during cornering, thereby stabilizing vehicle attitude.

Hereinafter, in order to facilitate understanding of the present invention, the present invention will be described with reference to the reference numerals in embodiments for the sake of convenience.

A vehicle attitude control device of the present invention is including a provisional standard yaw rate calculator 25 configured to obtain a standard yaw rate from a vehicle speed and a steering angle, a target yaw moment calculator 26 configured to generate target yaw moment on the basis of a deviation between an actual yaw rate detected by a sensor 19 and the standard yaw rate, and a braking/driving force allocator 22 configured to apply braking force or driving force, required to achieve the target yaw moment, to each wheel, the vehicle attitude control device including:

a detection speed processor 31 configured to perform a process such that a vehicle speed detected by a vehicle speed detector 16 gently changes;

a limit yaw rate calculator 28 configured to determine a limit yaw rate by dividing lateral acceleration by the processed vehicle speed; and a standard yaw rate corrector 29 configured to correct the standard yaw rate using the limit yaw rate when the standard yaw rate is higher than the limit yaw rate, wherein the target yaw moment calculator 26 generates the target yaw moment on the basis of a deviation between the standard yaw rate corrected by the standard yaw rate corrector 29 and the actual yaw rate.

This configuration is applied to a vehicle attitude control device 24 that obtains a target yaw rate from various vehicle state quantities such as a vehicle speed and a steering angle, that generates the target yaw moment on the basis of the deviation between the target yaw rate and an actual yaw rate, and that applies braking/driving force, required to achieve the target yaw moment, to each wheel. In this case, the limit yaw rate is determined by dividing the lateral acceleration by the vehicle speed processed such that the vehicle speed gently changes. In addition, the standard yaw rate calculated from the vehicle speed and the steering angle is corrected with the limit yaw rate. Therefore, tack-in associated with quick release of depression of an accelerator pedal during cornering or understeer due to depression of the accelerator pedal during cornering is inhibited, so that the vehicle attitude can be stabilized. Accordingly, with the above configuration, during cornering, understeer or tack-in can be inhibited from occurring in the case where the accelerator pedal is depressed or depression of the accelerator pedal is quickly released, so that the vehicle attitude is stabilized.

In the present invention, the vehicle attitude control device may further includes a limit lateral acceleration calculator 34 configured to set a product of a road surface friction coefficient estimated value and gravitational acceleration as limit lateral acceleration, and the limit yaw rate calculator 28 may use the limit lateral acceleration as the lateral acceleration for calculation. In the case of this configuration, the limit yaw rate is calculated on the basis of the road surface friction coefficient estimated value, as a maximum yaw rate that can be generated on the road surface. Thus, in the middle of rising of the actual lateral acceleration (in this case, actual lateral acceleration <limit lateral acceleration) at the initial stage of steering or at the time of quick turn of a steering wheel, the standard yaw rate is not needlessly limited to a low value, and responsiveness does not decrease. If the actual lateral acceleration is merely used for calculating the limit yaw rate, when the actual lateral acceleration at the initial stage of steering or at the time of quick turn of the steering wheel has not sufficiently risen, the limit yaw rate becomes low, and the standard yaw rate is needlessly limited to a low value (=the above-described limit yaw rate). As a result, the responsiveness of the yaw rate decreases in some cases. However, a decrease in the responsiveness of the yaw rate can be avoided by using the limit lateral acceleration as described above.

In the present invention, the limit yaw rate calculator 28 may use lateral acceleration detected by a lateral acceleration sensor 17, as the lateral acceleration for calculation. In the case of this configuration, estimation of a road surface friction coefficient is not required, and control can be simplified. In particular, this configuration is effective for reducing the yaw rate to be low. A decrease in the responsiveness of the yaw rate due to an excessive reduction in the yaw rate is concerned, but this configuration can be put to practical use.

In the present invention, a gradient limiter configured to limit a change amount per unit time as a process performed such that the vehicle speed gently or slowly changes may be used as the detection speed processor 31. When the gradient limiter is used for the above process as described above, pass frequency bands at an increase side and at a decrease side of, e.g., vehicle speed can be easily and individually set. Thus, it is easy to use the gradient limiter when different processes are performed at the increase side and at the decrease side.

When the gradient limiter is used as described above, in the detection speed processor 31, a pass frequency band at a vehicle speed decrease side may be set so as to be lower than a pass frequency band at a vehicle speed increase side as the process performed such that the vehicle speed gently changes. When the pass frequency band at the vehicle speed decrease side is set lower as described above, an increase in the limit yaw rate due to an accelerator being turned off during cornering can be assuredly inhibited, so that an occurrence of a spin can be reduced.

When the gradient limiter is used as described above, the detection speed processor 31 may change a limit value for a change amount of the vehicle speed per unit time in accordance with a depression change amount of an accelerator pedal 14 per unit time, may decrease a magnitude of a gradient limit value at a vehicle speed decrease side as a decrease rate of an accelerator pedal depression amount increases, and may decrease a magnitude of a gradient limit value at a vehicle speed increase side as an increase rate of the accelerator pedal depression amount increases. In the case of this configuration, a change in the vehicle attitude associated with depression of the accelerator pedal 14 or quick release of depression of the accelerator pedal 14 can be assuredly inhibited, and there is no possibility of giving a feeling of discomfort to the driver since the above process is not performed for a change in the vehicle speed due to a road surface grade or brake manipulation.

In the present invention, a vehicle 1 to be controlled may be a vehicle that allows one or both of braking force and driving force to be independently controlled for each wheel 2. When the vehicle is such a vehicle that allows braking force or driving force to be independently controlled for each wheel, the advantageous effects of the present invention are more effectively exerted. The vehicle that allows braking force or driving force to be independently controlled for each wheel is an in-wheel motor type four-wheel drive vehicle, but as another example, such a vehicle may be a vehicle having a mechanism in which outputs of two motors mounted on a vehicle body so as to correspond to the right and left wheels, respectively, are transmitted via a drive shaft, etc. to the respective wheels, and driving torque for each wheel is independently controlled, or a mechanism in which a friction brake is provided to each wheel, and the brake fluid pressure at each wheel can be independently controlled.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
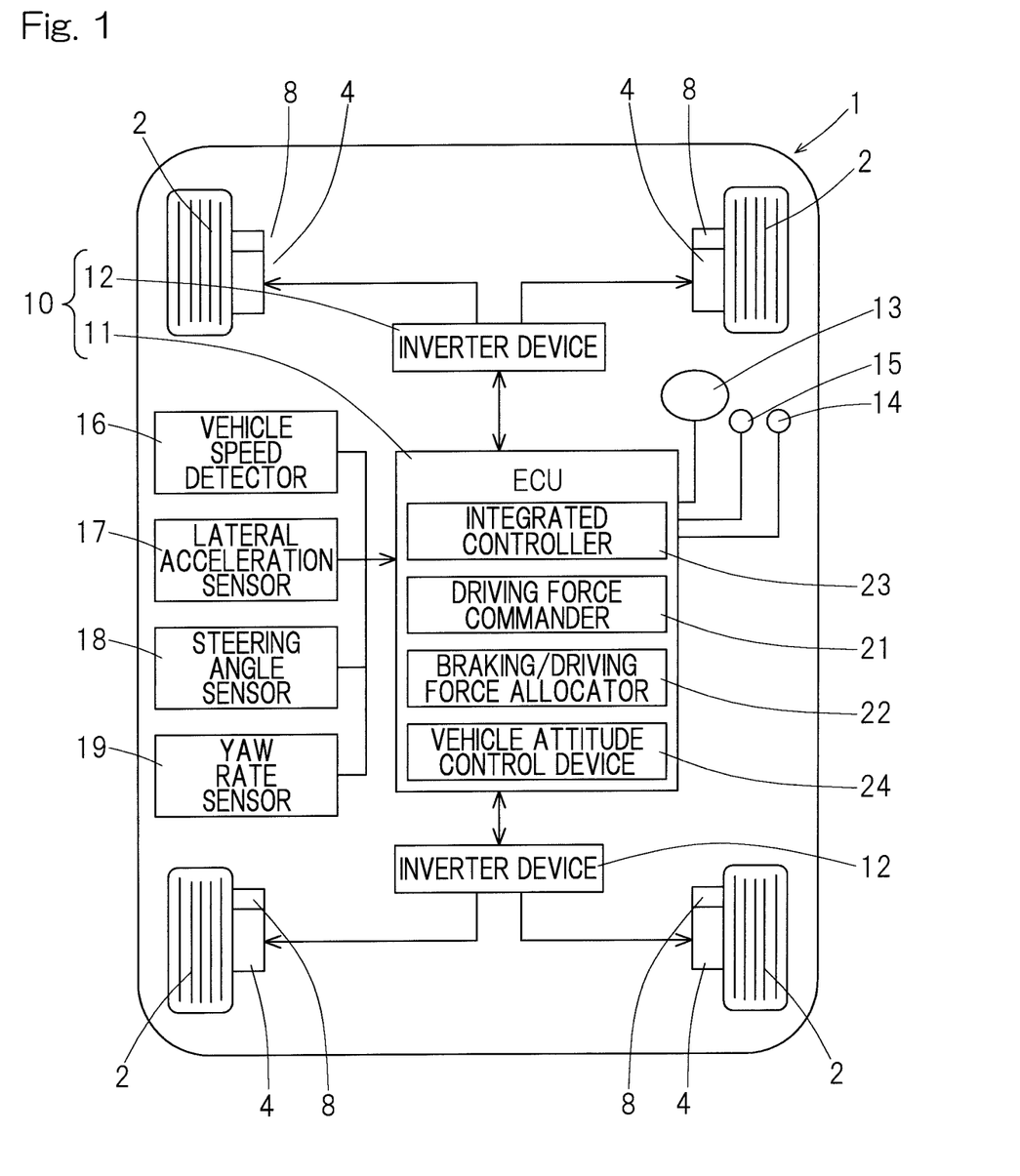
FIG. 1 is a system configuration diagram showing a conceptual configuration of an electric vehicle equipped with a vehicle attitude control device according to an embodiment of the present invention.

An embodiment of the present invention will be described with reference to FIG. 1 to FIG. 7. FIG. 1 shows a conceptual configuration of an electric vehicle that is a right-left wheel independent drive type vehicle equipped with a vehicle attitude control device 24 according to the embodiment in a vehicle controller 10, and the upper side of the drawing corresponds to the front side of the vehicle. The electric vehicle is a four-wheel independent drive vehicle in which wheels 2 that are the right and left rear wheels of the vehicle 1 and wheels 2 that are the right and left front wheels of the vehicle 1 are independently driven by electric motors 4 serving as power sources. The wheels 2 that are the front wheels are steered wheels. Each motor 4 forms a part of an in-wheel motor drive device 5 in FIG. 7, for example, but may be of an onboard type in which the motor is mounted on a chassis (not shown).

Figure 7:
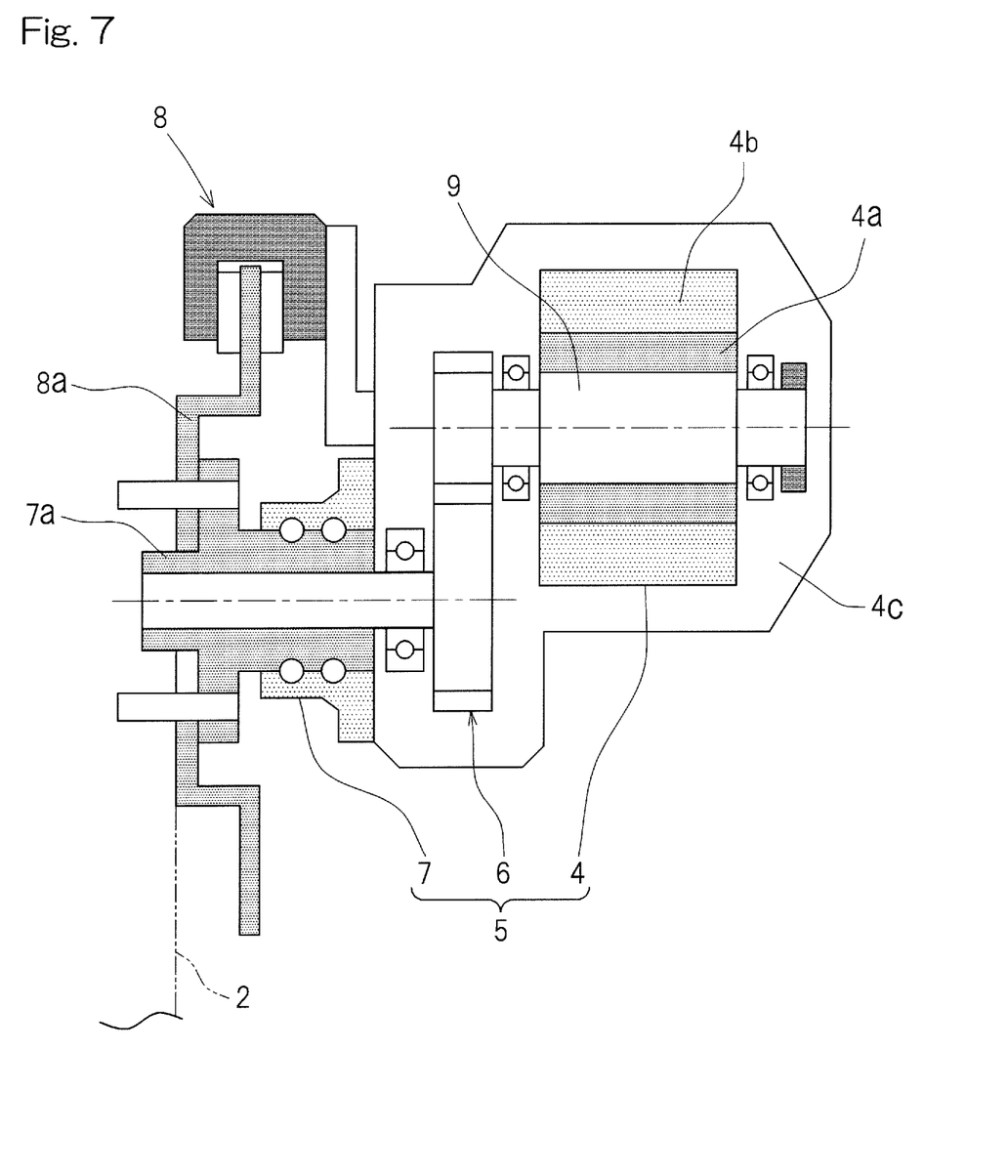
FIG. 7 is a schematic longitudinal-sectional view of an example of an in-wheel motor drive device.

In FIG. 7, the in-wheel motor drive device 5 includes the motor 4 that is an in-wheel motor (IWM), a speed reducer or reduction gear 6, and a wheel bearing 7, and these components are partly or entirely disposed within the wheel 2. Rotation of the motor 4 is transmitted via the speed reducer 6 and the wheel bearing 7 to the wheel 2. A brake rotor 8a forming a part of a friction brake device 8 is fixed to a flange portion of a hub ring 7a of the wheel bearing 7, and rotates integrally with the wheel 2. The motor 4 is, for example, an interior permanent magnet synchronous motor having permanent magnets in a core portion of a rotor 4a. The motor 4 is provided with a radial gap between a stator 4b fixed to a housing 4c and the rotor 4a mounted on a rotation output shaft 9.

A control system will be described with reference to FIG. 1. The vehicle controller 10 includes: an ECU 11 mounted on the vehicle 1; and a plurality of (two in this example) inverter devices 12 provided for the front and rear motors 4. The ECU 11 includes, as a basic configuration thereof, at least an integrated controller 23, a driving force commander 21, and a braking/driving force allocator 22. The integrated controller 23 performs integrated control and cooperative control of the entire vehicle. The driving force commander 21 generates a command of braking/driving force (braking force and driving force) for the entire vehicle, for example, a torque command, from a detection signal of a manipulation amount of an accelerator manipulator such as an accelerator pedal 14 and a detection signal of a manipulation amount of a brake manipulator such as a brake pedal 15. The braking/driving force allocator 22 allocates the command outputted by the driving force commander 21, to the respective inverter devices 12 for the motors 4 as individual braking/driving force commands, for example, as torque commands according to a setting rule that is based on a steering amount of a steering manipulator 13 such as a steering wheel, etc.

Each inverter device 12 converts DC power from a battery (not shown) to AC power for driving the motors 4, includes a control section (not shown) that controls the output and controls the corresponding motors 4 according to the above allocated braking/driving force command such as the torque command. In the shown example, the inverter device 12 is provided for each of the front and rear pairs of the right and left two motors 4. Each of the front and rear inverter devices 12 has a configuration to individually control the right and left motors 4. For example, in each inverter device 12, power circuitry (not shown) such as gate circuits with switching elements that perform conversion from DC power to AC power are provided for the right and left motors 4, respectively, and the single control section is configured to control the right and left power circuitry in a time-sharing manner or the like. Instead of the two inverter devices 12 provided as describe above, four inverter devices 12 may be individually provided for the respective motors 4.

The ECU 11 includes: a computer such as a microcomputer having a processor; and various other electronic circuits such as a ROM (Read Only Memory) having programs to be executed by the computer, a RAM (Random Access Memory), and a co-processor. The ECU 11 and each inverter device 12 are connected to each other via an in-vehicle communication network such as a CAN (control area network). The vehicle attitude control device 24 is provided in the ECU 11 in the vehicle controller 10 having the above basic configuration. In addition, the vehicle 1 is provided with, as sensors, a vehicle speed detector 16, a lateral acceleration sensor 17, a steering angle sensor 18, and a yaw rate sensor 19. The steering angle sensor 18 detects the steering angle of the steering manipulator 13 such as a steering wheel, or detects a steering angle from a turning device (not shown).

Figure 2:
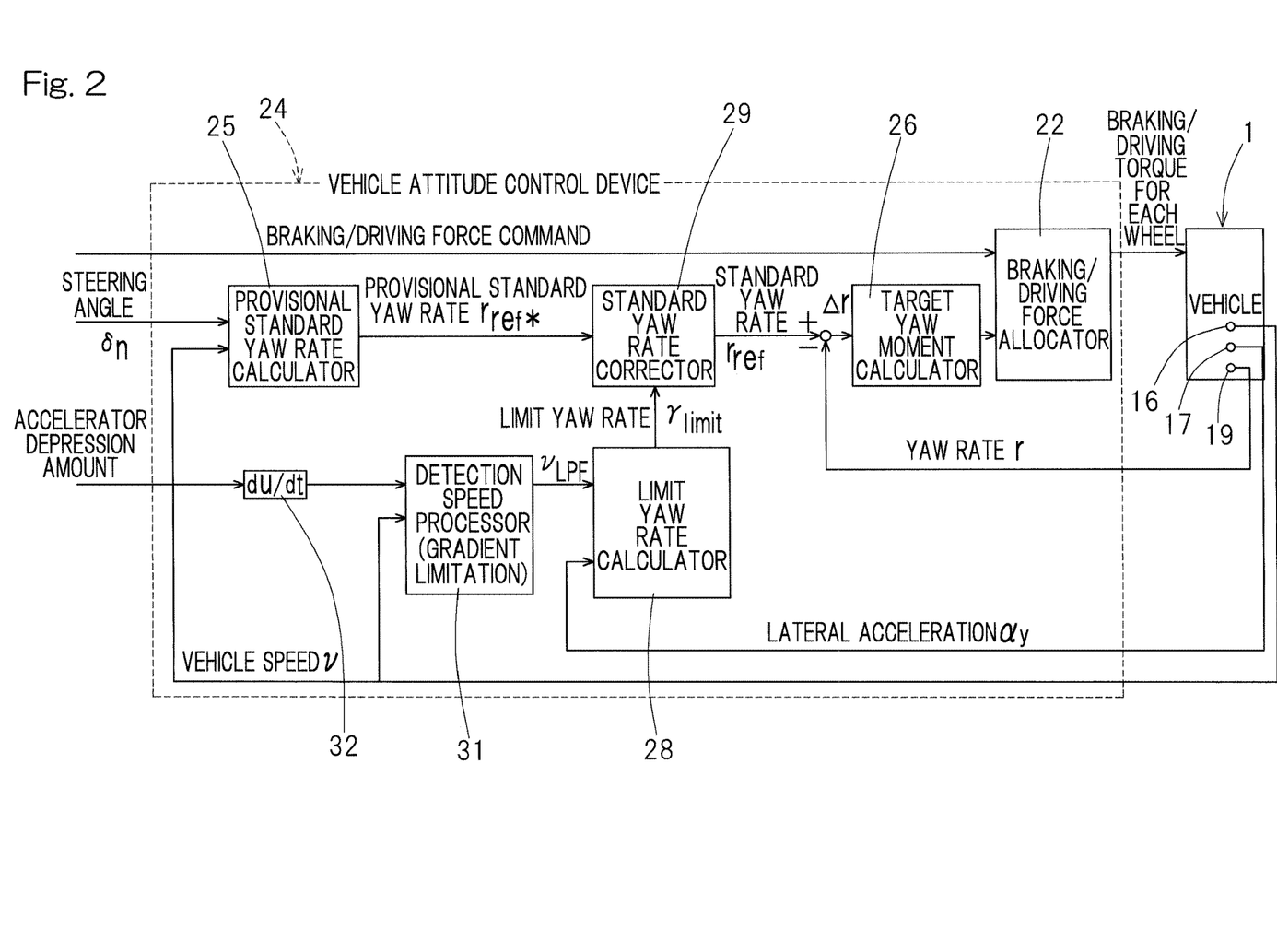
FIG. 2 is a control block diagram of an example of the vehicle attitude control device.

FIG. 2 is a control block diagram of the vehicle attitude control device 24. Describing the outline of the vehicle attitude control device 24, the vehicle attitude control device 24 obtains a standard yaw rate from various vehicle state quantities such as a vehicle speed and a steering angle, generates target yaw moment on the basis of the deviation between the standard yaw rate and an actual yaw rate, and applies braking/driving force, required to achieve the target yaw moment, to each wheel.

The vehicle attitude control device 24 includes, as a basic configuration thereof, a provisional standard yaw rate calculator 25, a target yaw moment calculator 26, and the braking/driving force allocator 22. The braking/driving force allocator 22 may be present outside as a block separate from the vehicle attitude control device 24 as in FIG. 1. In FIG. 2, the provisional standard yaw rate calculator 25 obtains a standard yaw rate from a vehicle speed and a steering angle. The target yaw moment calculator 26 generates target yaw moment on the basis of the deviation between the standard yaw rate and the actual yaw rate detected by the yaw rate sensor 19. The braking/driving force allocator 22 applies braking force or driving force, required to achieve the target yaw moment, to the motor 4 for each wheel 2.

The vehicle attitude control device 24 of this embodiment is further provided with a detection speed processor 31, a limit yaw rate calculator 28, a standard yaw rate corrector 29, and an accelerator change speed converter (du/dt) 32 in the above basic configuration. The detection speed processor 31 performs a process such that the vehicle speed detected by the vehicle speed detector 16 gently changes. As the detection speed processor 31, a gradient limiter is used in this embodiment, but a low-pass filter may be used. The accelerator change speed converter 32 obtains a depression change amount of the accelerator pedal 14 (see FIG. 1) per unit time. The limit yaw rate calculator 28 determines a limit yaw rate by dividing lateral acceleration by the vehicle speed processed by the detection speed processor 31. In this case, the target yaw moment calculator 26 generates target yaw moment on the basis of the deviation between the actual yaw rate and the standard yaw rate corrected by the standard yaw rate corrector 29 described later.

With such a configuration, the limit yaw rate is determined by dividing standard lateral acceleration, calculated from the measured lateral acceleration or various vehicle state quantities such as a vehicle speed and a steering angle, by the vehicle speed, processed such that the vehicle speed gently changes. The target yaw rate calculated from the vehicle speed and the steering angle is corrected with the limit yaw rate, whereby tack-in, associated with quick release of depression of the accelerator pedal during cornering, or understeer, due to depression of the accelerator pedal during cornering, is inhibited, so that the vehicle attitude can be stabilized.

In the case of the configuration in FIG. 2, the limit yaw rate calculator 28 uses the lateral acceleration detected by the lateral acceleration sensor 17, as the above lateral acceleration, for calculation. In the case of this configuration, estimation of a road surface friction coefficient is not required, and control can be simplified. In particular, this configuration is effective for reducing the yaw rate to be low. A decrease in the responsiveness of the yaw rate due to an excessive reduction in the yaw rate is concerned, but this configuration can be put to practical use.

Figure 3:
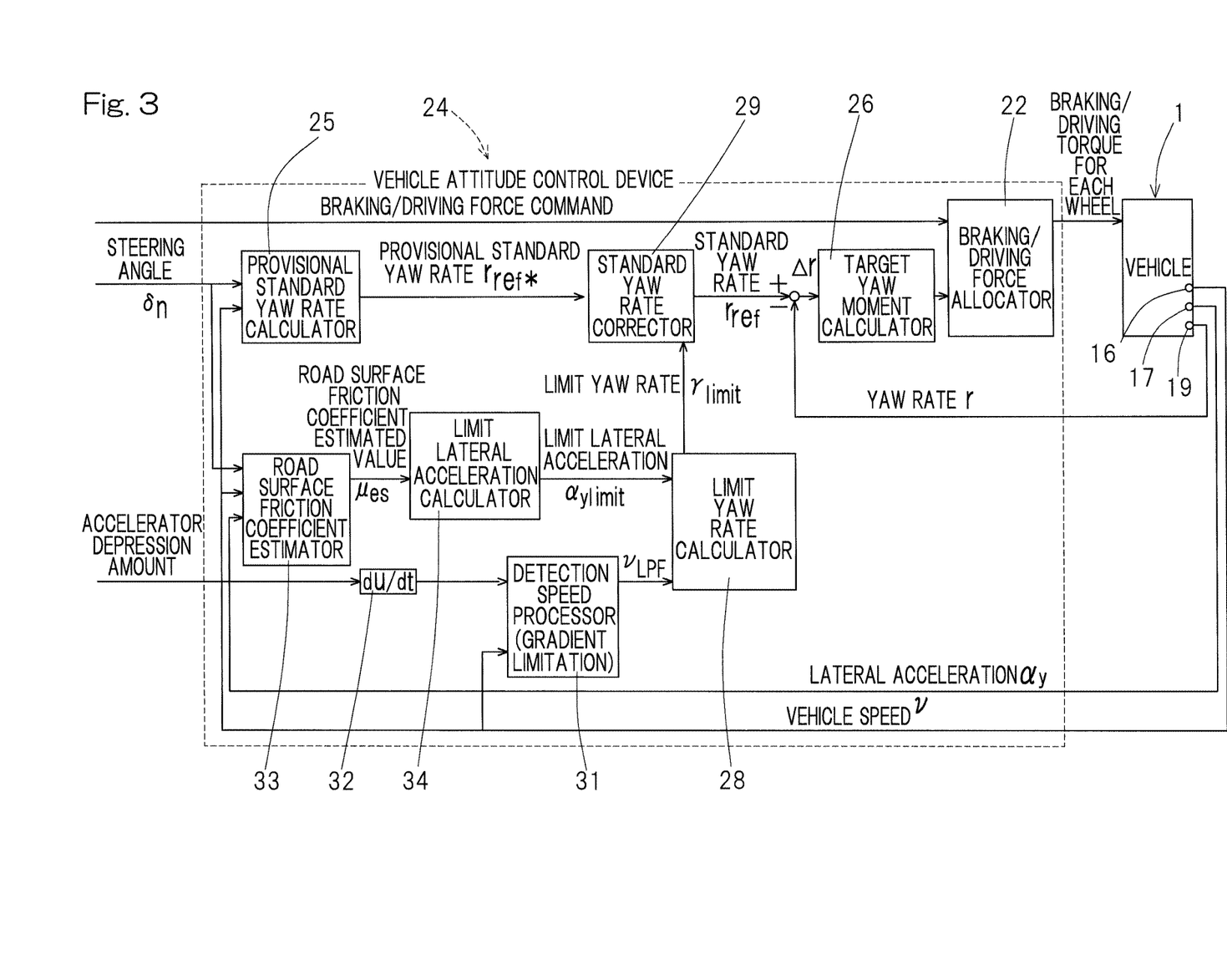
FIG. 3 is a control block diagram of another example of the vehicle attitude control device.

In the vehicle attitude control device 24 having the above configuration, a limit lateral acceleration calculator 34 may be provided as shown in FIG. 3, the product of a road surface friction coefficient estimated value and the gravitational acceleration may be set as limit lateral acceleration by the limit lateral acceleration calculator 34, and the limit yaw rate calculator 28 may use the limit lateral acceleration as the above lateral acceleration for calculation. The road surface friction coefficient estimated value may be obtained by a road surface friction coefficient estimator 33 from the steering angle, the vehicle speed, etc.

In the case of this configuration, a limit yaw rate is calculated on the basis of the road surface friction coefficient estimated value, as a maximum yaw rate that can be generated on the road surface. Thus, in the middle of rising of the actual lateral acceleration (in this case, actual lateral acceleration <limit lateral acceleration) at the initial stage of steering or at the time of quick turn of the steering wheel, the standard yaw rate is not needlessly limited to a low value, and the responsiveness does not decrease. If the actual lateral acceleration is merely used for calculating the limit yaw rate, when the actual lateral acceleration at the initial stage of steering or at the time of quick turn of the steering wheel has not sufficiently risen, the limit yaw rate becomes low, and the standard yaw rate is needlessly limited to a low value (=the above-described limit yaw rate). As a result, the responsiveness of the yaw rate decreases in some cases. However, a decrease in the responsiveness of the yaw rate can be avoided by using the limit lateral acceleration as described above.

In this example, as the detection speed processor 31, a gradient limiter that limits a change amount per unit time as the process performed such that the vehicle speed gently changes, is used. When the gradient limiter is used for the above process as described above, pass frequency bands at an increase side and at a decrease side of, e.g., vehicle speed can be easily and individually set. Thus, it is easy to use the gradient limiter when different processes are performed at the increase side and at the decrease side.

When the gradient limiter is used as the detection speed processor 31 as described above, a pass frequency band at the vehicle speed decrease side may be set in the detection speed processor 31 so as to be lower than a pass frequency band at the vehicle speed increase side, as the process performed such that the vehicle speed gently changes. When the pass frequency band at the vehicle speed decrease side is set lower as described above, an increase in the limit yaw rate due to an accelerator being turned off during cornering can be assuredly inhibited, so that occurrence of a spin can be reduced.

When the gradient limiter is used as the detection speed processor 31 as described above, the detection speed processor 31 may change a limit value for a change amount of the vehicle speed per unit time in accordance with a depression change amount of the accelerator pedal 14 (see FIG. 1) per unit time, may decrease the magnitude of a gradient limit value at the vehicle speed decrease side as a decrease rate of an accelerator pedal depression amount increases, and may decrease the magnitude of a gradient limit value at the vehicle speed increase side as an increase rate of the accelerator pedal depression amount increases. In the case of this configuration, a change in the vehicle attitude associated with depression of the accelerator pedal 14 or quick release of depression of the accelerator pedal 14 can be assuredly inhibited, and there is no possibility of giving a feeling of discomfort to the driver since the above process is not performed for a change in the vehicle speed due to a road surface grade or brake manipulation.

The driving force commander 21, the braking/driving force allocator 22, the integrated controller 23, the provisional standard yaw rate calculator 25, the target yaw moment calculator 26, the limit yaw rate calculator 28, the standard yaw rate corrector 29, the detection speed processor 31, the accelerator change speed converter 32, the road surface friction coefficient estimator 33, and the limit lateral acceleration calculator 34 are specifically configured with a hardware circuit or a software mathematical function on a processor (not shown) which enable calculation and output of a result thereof, with use of a LUT (Look Up Table) implemented by software or hardware, or a prescribed transform function contained in a library of software or hardware equivalent thereto, and, as necessary, a comparison function or a four arithmetic operation function in the library or hardware equivalent thereto, etc.

The vehicle attitude control device 24 having the above configuration executes calculation through the following procedure. A supplemental description for the configuration of the vehicle attitude control device 24 will also be given.

(1) The provisional standard yaw rate $\gamma_{ref}{}^*$ is determined on the basis of a vehicle model (determined as appropriate) from the steering angle $\delta_n$ and the vehicle speed V.

$$\gamma_{ref}{}^*(s) = G_\delta^r(0) \frac{\omega_n^2(T_r s + 1)}{s^2 + 2\omega_n \varsigma s + \omega_n^2} \delta_h(s) \quad \text{[Math. 1]}$$

Here, $G_\delta{}^r(0)$ is a yaw rate gain constant, $\omega_n$ is the natural frequency of the vehicle, $\xi$ is an attenuation ratio, $T_r$ is a constant, and s is the Laplacian operator.

(2) The product of a road surface friction coefficient estimated value $\mu_{es}$ multiplied by gravitational acceleration g is set as limit lateral acceleration $\alpha_{ylimit}$. The road surface friction coefficient is estimated by the road surface friction coefficient estimator 33 from, for example, the vehicle speed V, the steering angle $\delta_n$, lateral acceleration $\alpha_y$, etc.

Figure 4:
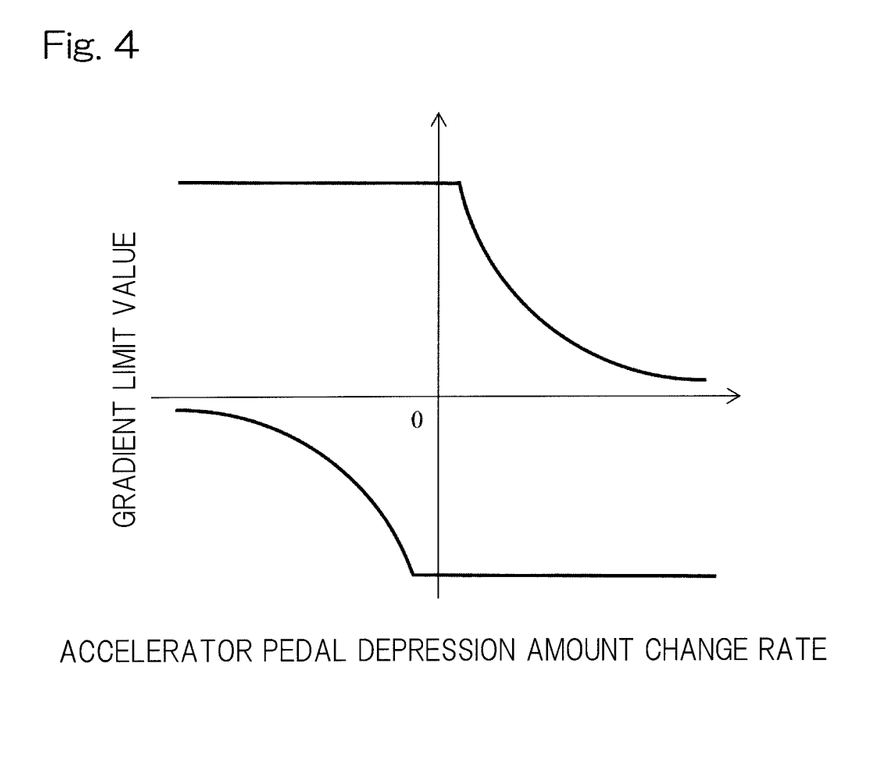
FIG. 4 is a graph showing a relationship between a change rate of an accelerator pedal depression amount and a gradient limit value in the vehicle attitude control device.

(3) The vehicle speed is processed to be $V_{LPF}$ by the detection speed processor 31 such that the vehicle speed gently changes. When gradient limitation in which a change amount per unit time is limited is used as the above process, gradient limitation at the vehicle speed increase side contributes to inhibition of understeer when the accelerator is turned on, and gradient limitation at the vehicle speed decrease side contributes to inhibition of tack-in when the accelerator is turned off. The gradient limit value may be changed in accordance with a change rate of the accelerator pedal depression amount. The magnitude of the gradient limit value at the vehicle speed decrease side is decreased as a decrease rate of the accelerator pedal depression amount increases. The magnitude of the gradient limit value at the vehicle speed increase side is decreased as an increase rate of the accelerator pedal depression amount increases. When the change rate of the accelerator pedal depression amount is not higher than a threshold, the magnitude of the gradient limit value is set to a sufficiently high value (FIG. 4). Regarding change of the gradient limit value, when the magnitude of the limit value is decreased, the magnitude of the limit value is quickly decreased, and when the magnitude of the limit value is increased, the magnitude of the limit value is increased more gently than when the magnitude of the limit value is decreased.

(4) The limit yaw rate is determined by dividing the limit lateral acceleration $\alpha_{ylimit}$ or the measured lateral acceleration $\alpha_y$ by the vehicle speed $V_{LPF}$.

$$\gamma_{limit}=\alpha_{ylimit}/V_{LPF} \text{ or } \gamma_{limit}=\alpha_y/V_{LPF}$$

(5) When the provisional standard yaw rate $\gamma_{ref}{}^*$ higher than the limit yaw rate $\gamma_{limit}$, the standard yaw rate corrector 29 limits and corrects the provisional standard yaw rate with the magnitude of the limit yaw rate.

$$|\gamma_{ref}|\leq|\gamma_{limit}|$$

(6) The target yaw moment calculator 26 calculates target yaw moment on the basis of the deviation $\Delta\gamma$ between the standard yaw rate and the actual yaw rate. Then, the target yaw moment calculator 26 determines whether the present state is an oversteer state or an understeer state, from information about the vehicle behavior such as the yaw rate, the yaw rate deviation, the vehicle speed, and the lateral acceleration. For example, when the absolute value of the actual yaw rate is lower than the absolute value of the standard yaw rate, the target yaw moment calculator 26 determines that the present state is understeer. In the case of the understeer state, in addition to the braking/driving force command value determined on the basis of the accelerator pedal depression amount or the like, braking force is applied to the front and rear inner wheels and driving force is applied to the front and rear outer wheels such that the target yaw moment is achieved in the inward direction of the vehicle. Accordingly, inward yaw moment occurs, and understeer tendency can be reduced.

Figure 5A:
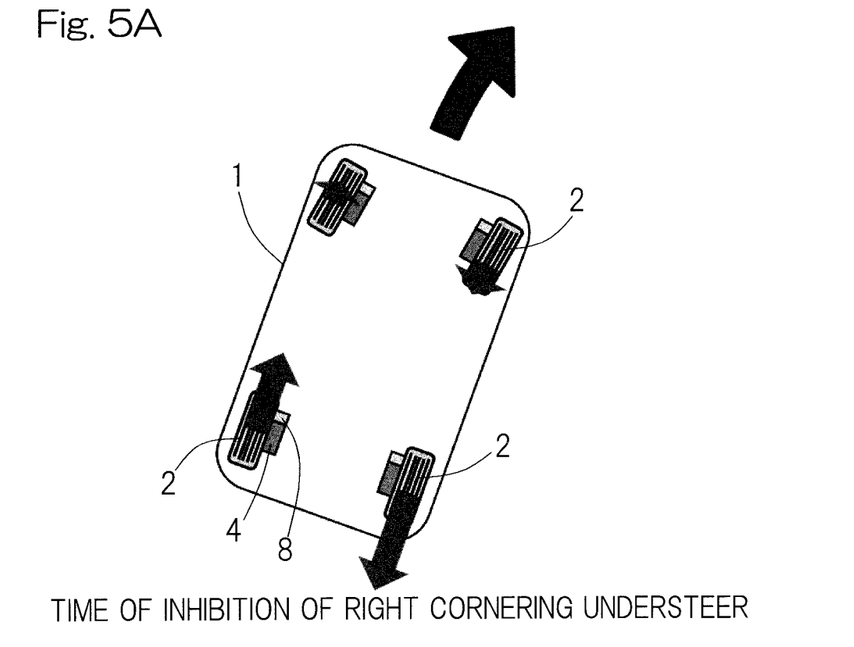
FIG. 5A illustrates braking/driving force of each wheel at the time of inhibition of right cornering understeer in a four-wheel drive vehicle to which the vehicle attitude control device is applied.
Figure 5B:
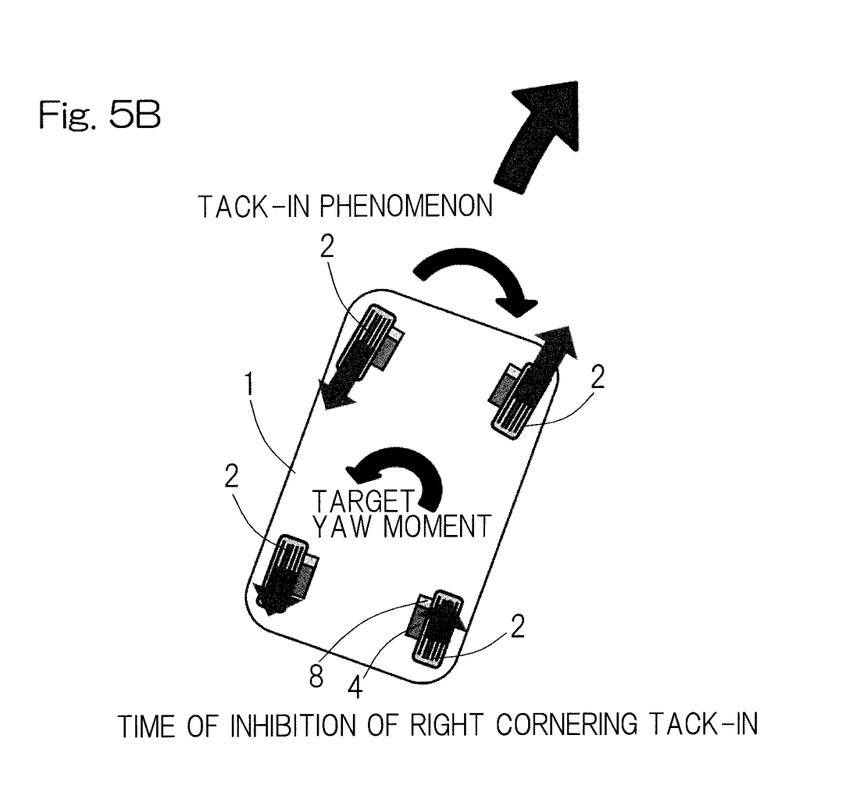
FIG. 5B illustrates braking/driving force of each wheel at the time of inhibition of right cornering tack-in in the four-wheel drive vehicle to which the vehicle attitude control device is applied.

FIG. 5A shows an example of braking/driving force applied to each wheel at the time of inhibition of right cornering understeer. The length of each arrow in the drawing indicates the magnitude of force. In this case, clockwise yaw moment is generated. Here, when depression of the accelerator pedal 14 (see FIG. 1) is quickly released, the yaw rate in the inward direction of the vehicle (clockwise direction) tends to increase, but tack-in is inhibited by generating yaw moment in the outward direction of the vehicle (FIG. 5B).

Due to the above, when depression of the accelerator pedal is quickly released during cornering, the vehicle speed decreases, but the limit yaw rate is calculated using the vehicle speed processed such that the vehicle speed gently changes, so that an increase in the limit yaw rate due to the decrease in the vehicle speed is inhibited. In addition, the standard yaw rate is corrected with this value as an upper limit, so that an increase in the standard yaw rate is also inhibited. Accordingly, an increase in the yaw rate can be inhibited, and tack-in can be inhibited.

When the accelerator pedal is depressed during cornering, the vehicle speed increases, but the limit yaw rate is calculated using the vehicle speed processed such that the vehicle speed gently changes, so that a decrease in the limit yaw rate due to the increase in the vehicle speed is inhibited. In addition, the standard yaw rate is corrected with this value as an upper limit, so that a decrease in the standard yaw rate is also inhibited. Accordingly, a decrease in the yaw rate is inhibited, and understeer can be inhibited.

By decreasing the magnitude of the gradient limit value at the vehicle speed decrease side as the decrease rate of the accelerator pedal depression amount increases and by decreasing the magnitude of the gradient limit value at the vehicle speed increase side as the increase rate of the accelerator pedal depression amount increases, a change in the vehicle attitude associated with depression of the accelerator pedal or quick release of depression of the accelerator pedal can be assuredly inhibited. Further, there is no possibility of giving a feeling of discomfort to the driver since the above process is not performed for a change in the vehicle speed due to a road surface grade or brake manipulation.

Since the pass frequency band at the vehicle speed decrease side in the process is set so as to be lower than the pass frequency band at the vehicle speed increase side in the process, an increase in the limit yaw rate due to the accelerator being turned off during cornering can be assuredly inhibited, so that the possibility of occurrence of a spin can be reduced.

Due to the above operations and effects, the vehicle attitude can be stabilized. In addition, a delay may occur with respect to the vehicle speed in the process performed such that the vehicle speed gently changes, but a delay does not occur with respect to steering since the process is performed only on the vehicle speed in limit yaw rate calculation. Moreover, when the actual lateral acceleration is not used but the limit lateral acceleration is used for calculating the limit yaw rate, a delay with respect to the vehicle speed does not occur during running in a normal range where the characteristics of cornering force of each tire are linear.

Figure 6A:
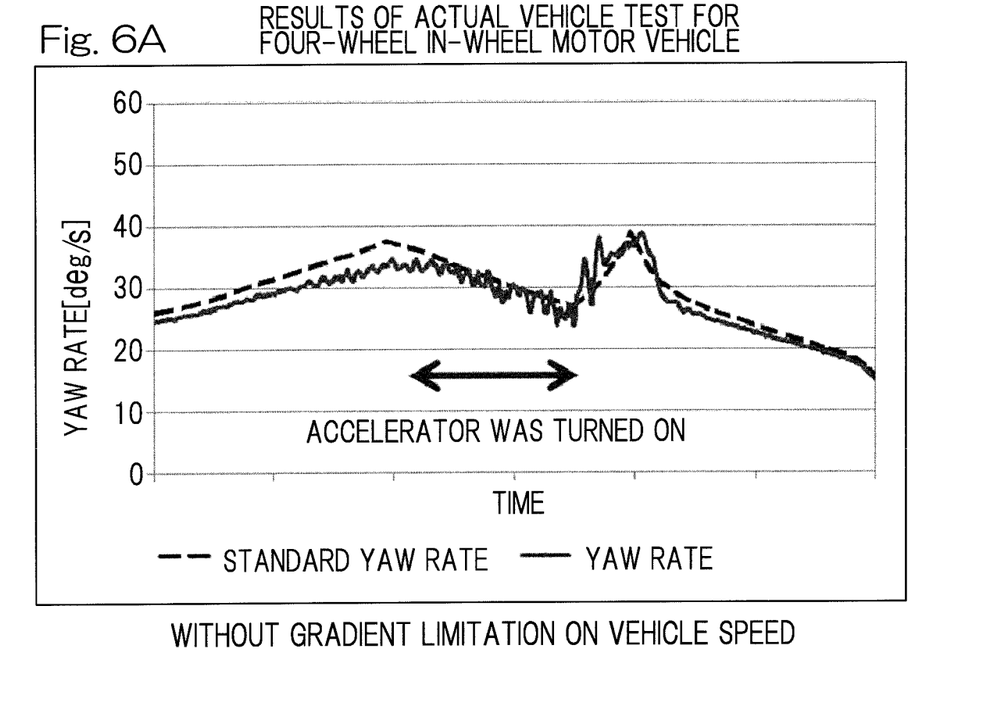
FIG. 6A is a graph showing the results of an actual vehicle test for yaw rate of a four-wheel in-wheel motor vehicle to which the vehicle attitude control device is applied, in the case without gradient limitation on a vehicle speed.
Figure 6B:
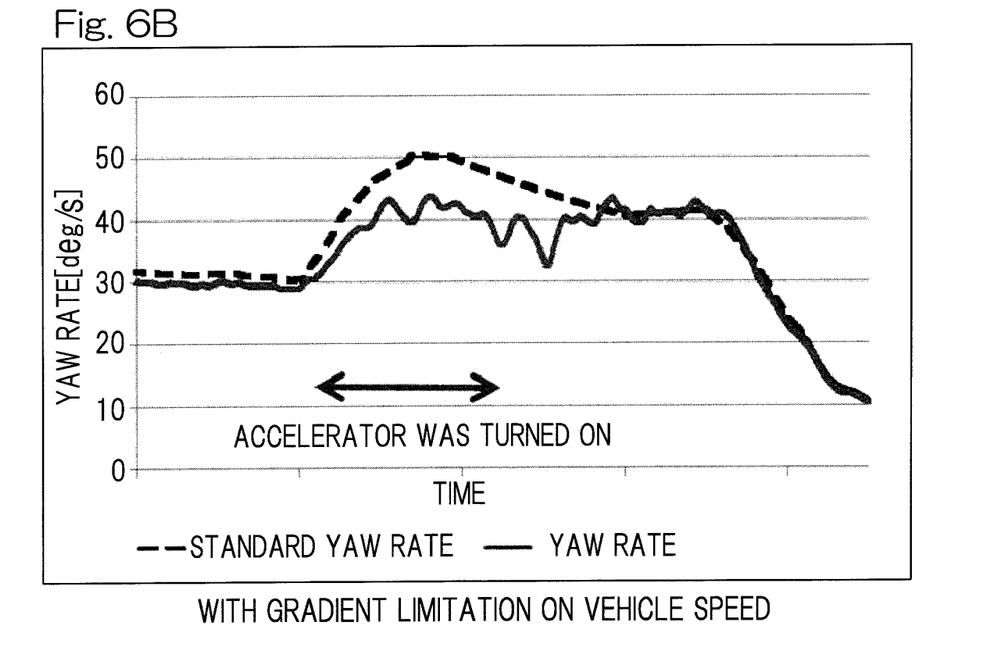
FIG. 6B is a graph showing the results of the actual vehicle test for yaw rate of the four-wheel in-wheel motor vehicle to which the vehicle attitude control device is applied, in the case with gradient limitation on a vehicle speed.

FIG. 6A shows the results of an actual vehicle test in the case without the process (without gradient limitation) on a vehicle speed, and FIG. 6B shows the results of the actual vehicle test in the case with the process (with gradient limitation) on a vehicle speed. In the test, the four-wheel in-wheel motor vehicle shown in FIG. 1 was used. In the test, during steady circle cornering, the accelerator pedal was fully depressed, and the depression of the accelerator pedal was released after several seconds. At this time, the steering angle was maintained constant. As shown in FIG. 6A and FIG. 6B, in the case without the process on a vehicle speed, the yaw rate quickly increased immediately after the accelerator was turned off, and, at this time, the standard yaw rate also increased and tack-in occurred. Meanwhile, in the case with the process on a vehicle speed, an increase in the yaw rate immediately after the accelerator was turned off was slight. In addition, the standard yaw rate did not increase and tack-in was inhibited. Moreover, after the accelerator was turned on, the yaw rate increased, and understeer was inhibited, so that the vehicle attitude was stabilized.

As described above, according to the above embodiment, since the limit yaw rate is calculated using the vehicle speed processed such that the vehicle speed gently changes, when the accelerator pedal is depressed or depression of the accelerator pedal is quickly released during cornering, a change in the standard yaw rate is inhibited, and understeer or tack-in can be inhibited, so that the vehicle attitude is stabilized. Since the process is performed only on the vehicle speed in limit yaw rate calculation, a delay with respect to steering does not occur, and, during running in the normal range, a delay with respect to the vehicle speed does not occur.

In the above example, the embodiment has been described using the in-wheel motor type four-wheel drive vehicle. However, as a vehicle that allows braking force or driving force to be independently controlled for each wheel, the above control is also applicable to, for example, a vehicle having a mechanism in which outputs of two motors mounted on a vehicle body so as to correspond to the right and left wheels, respectively, are transmitted via a drive shaft, etc. to the respective wheels, and driving torque for each wheel is independently controlled, or a mechanism in which a friction brake is provided to each wheel, and the brake fluid pressure at each wheel can be independently controlled.

Although the preferred modes for carrying out the present invention have been described on the basis of the embodiments with reference to the accompanying drawings, the embodiments disclosed herein are illustrative in all aspects and not restrictive. The scope of the present invention is indicated by the claims, rather than by the above description. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . vehicle
2 . . . wheel
4 . . . motor
5 . . . in-wheel motor drive device
10 . . . vehicle controller
11 . . . ECU
12 . . . inverter device
14 . . . accelerator pedal
15 . . . brake pedal
16 . . . vehicle speed detector
17 . . . lateral acceleration sensor
18 . . . steering angle sensor
19 . . . yaw rate sensor
22 . . . braking/driving force allocator
24 . . . vehicle attitude control device
25 . . . provisional standard yaw rate calculator
26 . . . target yaw moment calculator
28 . . . limit yaw rate calculator
29 . . . standard yaw rate corrector
31 . . . detection speed processor
32 . . . accelerator change speed converter
33 . . . road surface friction coefficient estimator
34 . . . limit lateral acceleration calculator

What is claimed is:

1. A vehicle attitude control device including a provisional standard yaw rate calculator configured to obtain a standard yaw rate from a vehicle speed and a steering angle, a target yaw moment calculator configured to generate target yaw moment on the basis of a deviation between an actual yaw rate detected by a sensor and the standard yaw rate, and a braking/driving force allocator configured to apply braking force or driving force, required to achieve the target yaw moment, to each wheel, the vehicle attitude control device comprising:
    a detection speed processor configured to perform a process such that a vehicle speed detected by a vehicle speed detector gently changes;
    a limit yaw rate calculator configured to determine a limit yaw rate by dividing lateral acceleration by the processed vehicle speed; and
    a standard yaw rate corrector configured to correct the standard yaw rate using the limit yaw rate when the standard yaw rate is higher than the limit yaw rate, wherein
    the target yaw moment calculator generates the target yaw moment on the basis of a deviation between the standard yaw rate corrected by the standard yaw rate corrector and the actual yaw rate.

2. The vehicle attitude control device as claimed in claim 1, further comprising a limit lateral acceleration calculator configured to set a product of a road surface friction coefficient estimated value and gravitational acceleration as limit lateral acceleration, wherein
    the limit yaw rate calculator uses the limit lateral acceleration as the lateral acceleration for calculation.

3. The vehicle attitude control device as claimed in claim 1, wherein the limit yaw rate calculator uses lateral acceleration detected by a lateral acceleration sensor, as the lateral acceleration for calculation.

4. The vehicle attitude control device as claimed in claim 1, wherein a gradient limiter configured to limit a change amount of the vehicle speed per unit time as a process performed such that the vehicle speed gently changes is used as the detection speed processor.

5. The vehicle attitude control device as claimed in claim 4, wherein, in the detection speed processor, a pass frequency band at a vehicle speed decrease side is set so as to be lower than a pass frequency band at a vehicle speed increase side as the process performed such that the vehicle speed gently changes.

6. The vehicle attitude control device as claimed in claim 4, wherein the detection speed processor changes a limit value for a change amount of the vehicle speed per unit time in accordance with a depression change amount of an accelerator pedal per unit time, decreases a magnitude of a gradient limit value at a vehicle speed decrease side as a decrease rate of an accelerator pedal depression amount increases, and decreases a magnitude of a gradient limit value at a vehicle speed increase side as an increase rate of the accelerator pedal depression amount increases.

7. The vehicle attitude control device as claimed in claim 1, wherein a vehicle to be controlled is a vehicle that allows one or both of braking force and driving force to be independently controlled for each wheel.

* * * * *